May 9, 1961     J. L. BREESE     2,983,313
RE-CIRCULATING POT-TYPE BURNER
Filed July 20, 1954     2 Sheets-Sheet 1

Inventor
James L. Breese by Parker & Carter
Attorneys

May 9, 1961 J. L. BREESE 2,983,313
RE-CIRCULATING POT-TYPE BURNER
Filed July 20, 1954 2 Sheets-Sheet 2
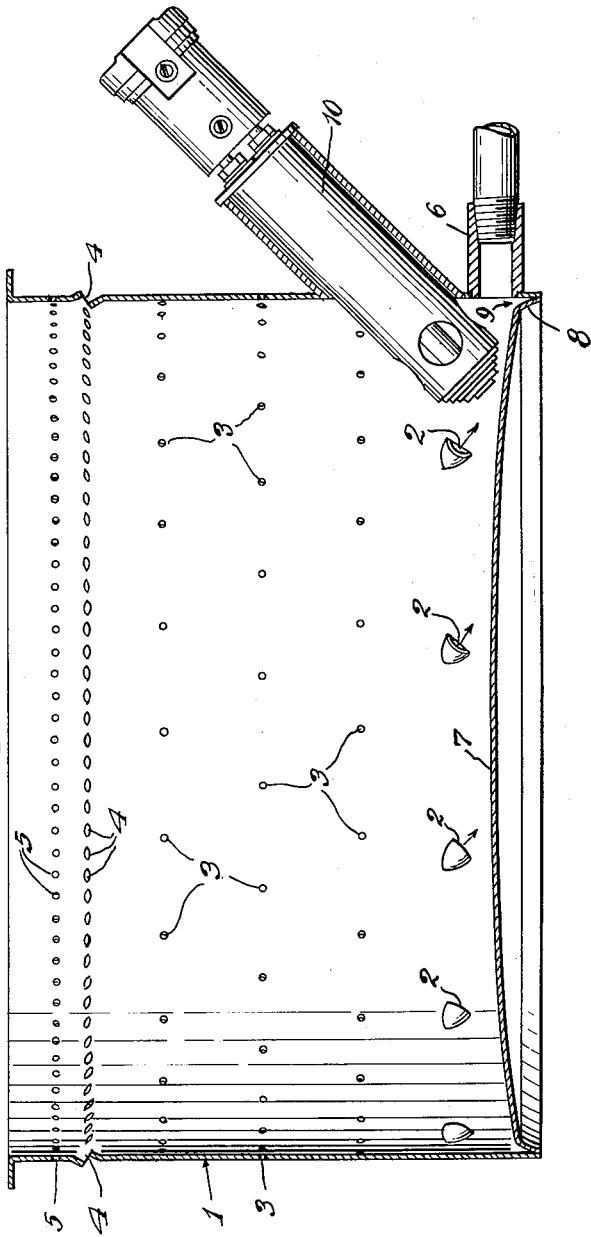
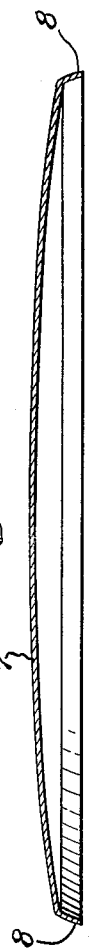
Inventor
James L. Breese
by Parker & Carter
Attorneys

United States Patent Office 2,983,313
Patented May 9, 1961

2,983,313

RE-CIRCULATING POT-TYPE BURNER

James L. Breese, Santa Fe, N. Mex., assignor, by mesne assignments, to Controls Company of America, Schiller Park, Ill., a corporation of Delaware Filed July 20, 1954, Ser. No. 444,465

4 Claims. (Cl. 158—91)

This invention is directed to a new and improved burner pot for hydrocarbon fuels. One purpose of the present invention is the provision of a new method for manufacturing burner pots.

Another object of the present invention is the provision of a simplified and less expensive burner pot structure.

Another object of the present invention is the provision of a new and improved form of burner pot which is designed so as to improve the distribution of fuel vapors and gases of combustion within the pot.

Another object of the present invention is the provision of a new and improved form of burner pot which eliminates the need for a pilot ring or other pilot structure.

Other objects will appear manifest from a reading of the specification and claims which follow.

Referring generally now to the drawings:

Figure 2 is a sectional view of the device shown in Figure 1;

Figure 4 is a side view of one of the elements used in the burner pot shown in Figure 1.

Like elements are designated by like characters throughout the specification and drawings.

Figure 1:
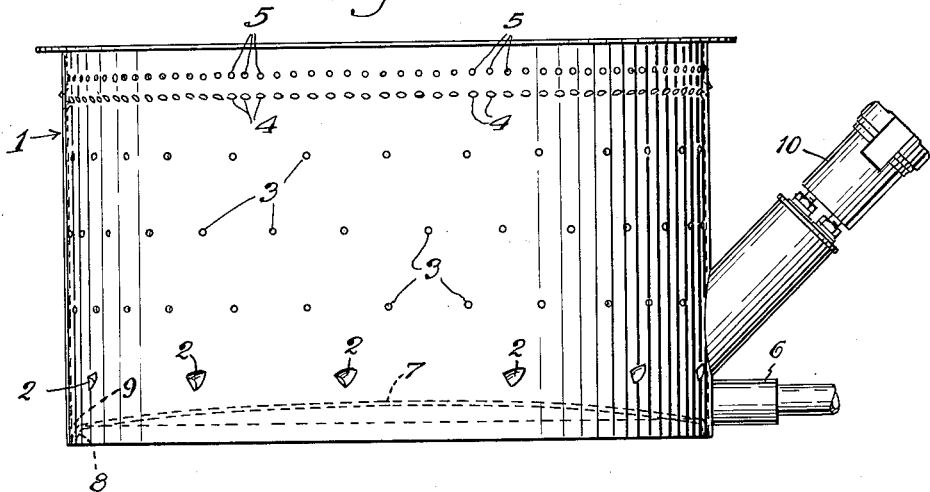
Figure 1 is a side view illustrating one form of my improved burner pot.
Figure 3:
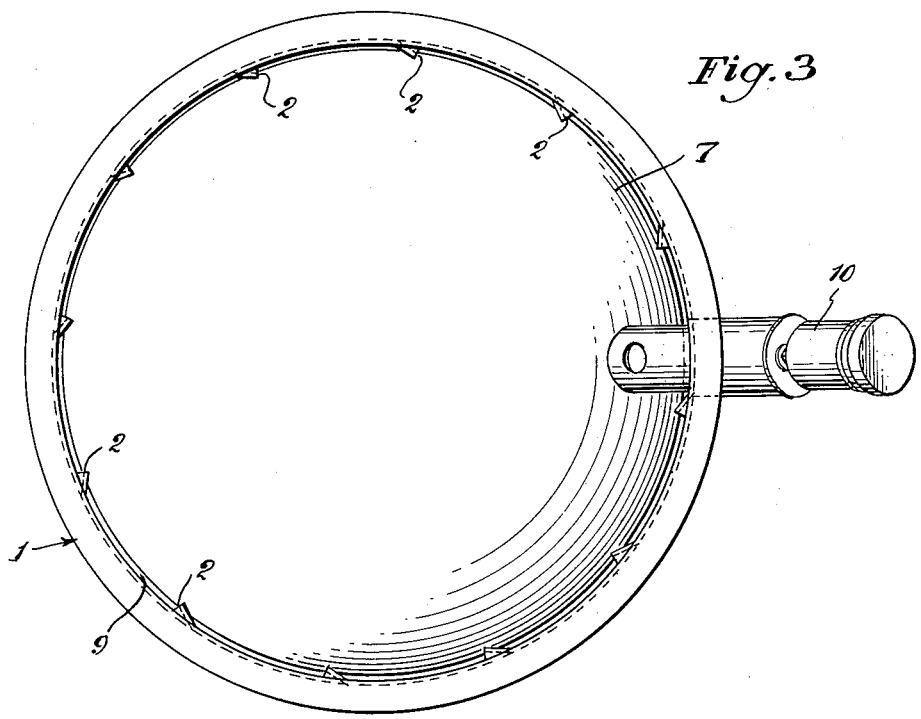
Figure 3 is a plan view of the device shown in Figgure 1.

Referring specifically now to the drawings and in the first instant to Figure 1.

1 designates the preferably generally cylindrical side wall of a burner pot. The pot is shown as provided with a plurality of apertures 2, 3, 4, and 5 spaced circumferentially about the pot side wall and located at various distances from the ends of the pot. The lowest row of apertures 2 are herein shown as directed downwardly and inwardly toward the bottom of the pot. In the pot as shown in the drawings the apertures 2 constitute primary apertures and are so formed as to direct inclined air jets downwardly and inwardly at preferably uniform angles from the radial. The intermediate rows of apertures 3 are indicated as radially punched holes. The rows of apertures 4 and 5 constitute secondary air inlet apertures for mixing secondary air with the rich mixture of vaporized hydrocarbon and of air delivered inwardly to the pot interior by the apertures 2 and 3. In the particular pot shown herein I illustrate two rows of secondary apertures 4 and 5 with the upper row 5 formed to direct radial inward jets perpendicular to the axis of the pot and with the lower row 4 directing impinging jets upwardly and inwardly toward the top opening of the pot. It will be understood however that I may employ any other suitable means for supplying the secondary air to the primary mixture formed within the pot.

As is the customary practice, an oil inlet is positioned near the lower portion of the wall of the pot so as to deliver oil to the interior of the pot.

It is customary in the design and formation of burner pots of this general type to form a bottom wall 7 for the pot by a relatively deep drawn metal section. An illustration of this type of deep drawn bottom wall may be found in United States Letters Patent No. 2,393,232, issued to James L. Breese on January 22, 1946, as an example. The drawing process is relatively expensive. According to this practice, the bottom section is generally cup shaped and the upper side portions of the section embrace the lower portion of the side walls of the burner.

According to my invention, I employ a bottom wall which is formed from a comparatively shallow metal stamping. This wall is received within the confines of the cylindrical side wall. This bottom wall is generally dome shaped. As will be seen most clearly in Figure 2, the bottom wall has a peripheral, down-turned edge portion or flange 8 which makes a snug fit with the lower inner face of the side wall of the pot. This edge or flange 8 is inclined or flared outwardly to a slight extent so that when it is positioned, as shown in Figure 2, the lower edge of the flange 8 engages the inner face of the cylindrical pot wall while the upper or base portion of the flange is spaced inwardly away from said side wall and defines with the side wall a circumferentially extending, relatively narrow recess 9 adjacent the inner side wall of the pot. This recess is positioned slightly below the fuel inlet 6 so that oil delivered through the inlet 6 flows into the recess 9. The bottom wall may be welded to the side wall. Any suitable ignition mechanism 10 diagrammatically illustrated in Figure 2 may extend through the side wall of the pot. It may include a resistance heating element at the lower end portion thereof which is adjacent the recess 9 and the fuel inlet 6.

When fuel is delivered to the recess 9 it flows rapidly around the recess so that a comparatively narrow stream of oil is delivered completely around the interior of the pot at the lower portion thereof and adjacent the side wall thereof. When the fuel is ignited by the ignition mechanism 10 the flame spreads evenly around this recess and causes a uniform generation and distribution in the pot.

Whereas I have shown and described an operative form of my invention, I wish it to be understood that this showing is to be taken in an illustrative and diagrammatic sense only. There are many modifications to this invention which will be apparent to those skilled in the art and which will fall within the scope and spirit of my invention. The scope of the invention, therefore, should be limited only by the scope of the hereinafter appended claims.

The use and operation of my invention are as follows;

I employ a generally dome-shaped bottom wall formed from a relatively shallow stamping in a burner pot. This bottom wall is comparatively easy to fabricate and uses less metal than previous bottom wall constructions. Its downwardly extending edge is relatively short as contrasted with the relatively long and up-standing side wall of the customary pot bottom. The downwardly and outwardly inclined edge defines with the cylindrical side wall of the pot a comparatively narrow recess disposed adjacent the side wall of the pot. When oil is supplied through the inlet 6 it will tend to be distributed rapidly around this recess and the gases generated are comparatively evenly distributed around the inner side wall.

When the fuel is ignited by the ignition device 10 the flame tends to spread evenly around the inner side wall. In a broad sense, I obtain the advantage of a wick without using a wick. The oil or liquid fuel which enters through the fitting 6 forms a relatively deep liquid body having a restricted upper surface. In practice, when the fuel is ignited, a narrow flame extends about the pot bottom closely adjacent the inner side wall and closely adjacent the lowest row of air inlet apertures.

The downwardly and inwardly directed primary air apertures cause a swirling of the air supplied to the pot over the fuel in the recess.

Thus, with a single comparatively simple metal stamping I reduce the cost of manufacture of burner pots and, at the same time, eliminates the need for a pilot ring and gain important fuel distributing and gas generation advantages in the pot. My structure is particularly well adapted for use in burner pots employed with valves other than the conventional float valves. The lowest row of apertures 2 is at a level closely adjacent the level of the liquid fuel in the "wick" slot 9. I thus have a narrow slot of fuel extending entirely around the exterior of the pot and adjacent the pot side wall, with the upper surface of the annular liquid body closely adjacent the level of the lowest row of air inlets 2. Whereas, under some circumstances, it may be advantageous to tilt the apertures 2 downwardly, or to spiral them, this is not, in practice, necessary. What is essential and important is that an air supply is available at a low level in the pot, adjacent the level of the fuel in the slot.

I claim:

1. In a burner pot for hydrocarbon fuels, a generally cylindrical side wall having vertically spaced rows of apertures formed therein for the admission of primary air and secondary air to the interior of the pot, inlet means for admitting fuel through a lower portion of said side wall, said pot having a dome-shaped bottom wall, said bottom wall having a down-turned peripheral flange, said peripheral flange being outwardly inclined with respect to the axis of said cylindrical wall, the lower edge of the peripheral flange engaging the inner face of the side wall with the upper portion of said flange being spaced inwardly therefrom thereby defining a circumferentially extending narrow recess for fuel delivered through said inlet means, and means for directing air to the fuel in said recess to thereby generate gases around the side wall and cause spreading of a flame around the recess upon ignition.

2. A burner pot for liquid fuels which includes a generally cylindrical side wall having primary air inlet apertures spaced circumferentially thereabout and located at various distances from the bottom of the pot, the pot having a generally dome-shaped bottom wall positioned within the cylindrical side wall, the outer edge portion of the bottom wall being provided with a downwardly and outwardly inclined peripheral flange the lower edge portion of which engages the inner face of the cylindrical side wall of the pot with the upper portion of said flange in spaced relation to said side wall, said flange, with the side wall, defining a circumferential narrow upwardly open fuel distributing recess extending about the pot at the bottom of the side wall, and means for delivering liquid fuel to said recess, the lowest row of air inlet apertures being downwardly and tangentially directed to deliver air to the fuel in said recess, the pot having an open top and being provided adjacent its upper end with air inlet means formed and adapted to admit secondary air in volumes adequate for the complete combustion of vaporized liquid fuel mixed with air of the primary air inlet apertures.

3. The burner pot described in claim 2, characterized in that the circumferential fuel-distributing recess has a radial width less than its effective fuel-receiving depth.

4. The burner pot described in claim 2, characterized by and including ignition means located within the pot adjacent the point of delivery of liquid fuel to said recess.

References Cited in the file of this patent

UNITED STATES PATENTS

| | | |
|---|---|---|
| 2,369,999 | Behrendt et al. | Feb. 20, 1945 |
| 2,476,871 | Huston | July 19, 1949 |
| 2,501,688 | Peeling | Mar. 28, 1950 |
| 2,535,923 | Hill | Dec. 26, 1950 |
| 2,640,648 | Judson | June 2, 1953 |
| 2,663,366 | Harris | Dec. 22, 1953 |
| 2,713,388 | Todoroff | July 19, 1955 |